(12) United States Patent
Dawe et al.

(10) Patent No.: US 11,103,783 B2
(45) Date of Patent: Aug. 31, 2021

(54) SPORTS SIMULATION SYSTEM

(71) Applicant: INTERACTIVE SPORTS TECHNOLOGIES INC., Vaughan (CA)

(72) Inventors: Wayne Dawe, Vaughan (CA); Silviu Druma, Vaughan (CA); Aaron Fritz, Vaughan (CA); Zuqiang Zhao, Vaughan (CA); Yijun Tang, Vaughan (CA)

(73) Assignee: INTERACTIVE SPORTS TECHNOLOGIES INC., Vaughan (CA)

( * ) Notice: Subject to any disclaimer, the term of this patent is extended or adjusted under 35 U.S.C. 154(b) by 164 days.

(21) Appl. No.: 15/969,100

(22) Filed: May 2, 2018

(65) Prior Publication Data

US 2018/0318715 A1    Nov. 8, 2018

Related U.S. Application Data

(60) Provisional application No. 62/500,189, filed on May 2, 2017.

(51) Int. Cl.
    *A63F 13/00*     (2014.01)
    *A63F 13/573*    (2014.01)
    (Continued)

(52) U.S. Cl.
    CPC ........ *A63F 13/573* (2014.09); *A63B 24/0021* (2013.01); *A63B 71/0622* (2013.01);
    (Continued)

(58) Field of Classification Search
    CPC .......... A63B 69/3658; A63B 2220/833; A63B 2220/836; A63B 2220/89
    See application file for complete search history.

(56) References Cited

U.S. PATENT DOCUMENTS

| 2006/0063574 A1* | 3/2006 | Richardson ........... A63F 13/213 463/1 |
| 2016/0354664 A1* | 12/2016 | DeCarlo .................... F41J 3/00 |
| 2017/0157482 A1* | 6/2017 | DeCarlo .................... F41J 3/00 |

* cited by examiner

*Primary Examiner* — Omkar A Deodhar
*Assistant Examiner* — Eric M Thomas
(74) *Attorney, Agent, or Firm* — Faegre Drinker Biddle & Reath LLP

(57) ABSTRACT

A sports simulation system comprises a projectile tracking apparatus configured to detect a projectile traveling through a projectile tracking region towards a display surface, a controller comprising one or more actuatable buttons, each actuatable button configured to communicate one or more control signals in response to actuation thereof, and at least one processing stage configured to receive data from the projectile tracking apparatus and determine three-dimensional positions, velocity and acceleration of a detected launched projectile traveling through said projectile tracking region, the three-dimensional positions, velocity and acceleration used by said at least one processing stage to calculate a trajectory of said launched projectile into a three-dimensional sports scene, receive one or more control signals from the controller and determine one or more control commands of one or more animated objects based on the one or more control signals, and use said calculated trajectory and said one or more control commands to generate updated image data including a simulation of said launched projectile into said three-dimensional sports scene and manipulate one or more animated objects associated with said three-dimensional sports scene, the updated image data associated with a sports result.

15 Claims, 16 Drawing Sheets

(51) Int. Cl.
*A63F 13/213* (2014.01)
*A63F 13/235* (2014.01)
*A63F 13/52* (2014.01)
*A63F 13/807* (2014.01)
*A63F 13/812* (2014.01)
*A63B 24/00* (2006.01)
*A63B 71/06* (2006.01)
*A63B 69/00* (2006.01)

(52) U.S. Cl.
CPC .......... *A63F 13/213* (2014.09); *A63F 13/235* (2014.09); *A63F 13/52* (2014.09); *A63F 13/807* (2014.09); *A63F 13/812* (2014.09); *A63B 69/0002* (2013.01); *A63B 69/002* (2013.01); *A63B 69/0024* (2013.01); *A63B 2024/0034* (2013.01); *A63B 2071/0625* (2013.01); *A63B 2071/0638* (2013.01); *A63B 2220/05* (2013.01); *A63B 2220/35* (2013.01); *A63B 2220/807* (2013.01); *A63B 2225/50* (2013.01)

1

SPORTS SIMULATION SYSTEM

CROSS-REFERENCE TO RELATED APPLICATIONS

This application claims the benefit of U.S. Provisional Patent Application No. 62/500,189, filed on May 2, 2017, the entirety of which is incorporated herein by reference.

FIELD

The present invention relates generally to entertainment systems and in particular to a sports simulation system.

BACKGROUND

Sports simulation systems designed to simulate sports experiences are well known in the art. In many conventional sports simulation systems, a player propels a sports projectile such as a ball, puck, arrow, dart, etc. at a target image presented on a display screen. The motion of the sports projectile is detected and imaged and an extrapolation of the trajectory of the sports projectile is made. The extrapolated trajectory is then used to determine a sports result. The displayed image is in turn updated to reflect the sports result thereby to provide the player with visual feedback and simulate a sports experience.

The goal of all sports simulation systems is to provide the player with a realistic sports experience. As a result, many variations of sports simulation systems have been considered in attempts to simulate accurately "real-life" sports experiences. For example, U.S. Pat. No. 5,333,874 to Arnold et al. discloses a sports simulator having a housing and two arrays of infrared (IR) receivers and emitters positioned in the housing. A launch area is established near one end of the housing. A user can launch an object such as a golf ball located in the launch area and drive the golf ball into the housing through the planes defined by the arrays of IR emitters and against a screen positioned at one end of the housing. A computer is connected to the IR receivers, which detect the passage of the object through the respective planes. Based upon the signals from the IR receivers, the computer uses triangulation techniques to determine the horizontal and vertical position, as well as the velocity of the golf ball. The computer can also determine the spin of the golf ball and cause an image of the golf ball as it would have appeared traveling away from the golfer had it not encountered the screen to be displayed on the screen.

U.S. Patent Application Publication No. 2006/0063574 to Richardson et al. discloses a sports simulation system comprising a projectile tracking apparatus having a display surface on which a three-dimensional sports scene is presented. The projectile tracking apparatus captures images of a projectile tracking region disposed in front of the display surface to detect a launched projectile traveling through the projectile tracking region towards the display surface. At least one processing stage communicates with the projectile tracking apparatus and is responsive to the data received from the projectile tracking apparatus to determine the three-dimensional positions, velocity, acceleration and spin of a detected projectile traveling through the projectile tracking region. The determined three-dimensional positions, velocity, acceleration and spin are used by the at least one processing stage to calculate a trajectory of the launched projectile into the three-dimensional sports scene. Updated image data is generated by the at least one processing stage that includes a simulation of the launched projectile into the three-dimensional sports scene following the calculated trajectory. A projection unit coupled to the at least one processing stage receives the image data from the at least one processing stage and presents the three-dimensional sports scene, including the simulation, on the display surface.

Although this sports simulation system provides a better and more realistic sports experience, an enhanced multiplayer experience is desired. It is therefore an object of the present invention to provide a novel sports simulation system.

SUMMARY

Accordingly in one aspect there is provided a sports simulation system comprising a projectile tracking apparatus configured to detect a projectile traveling through a projectile tracking region towards a display surface, a controller comprising one or more actuatable buttons, each actuatable button configured to communicate one or more control signals in response to actuation thereof, and at least one processing stage configured to receive data from the projectile tracking apparatus and determine three-dimensional positions, velocity and acceleration of a detected launched projectile traveling through said projectile tracking region, the three-dimensional positions, velocity and acceleration used by said at least one processing stage to calculate a trajectory of said launched projectile into a three-dimensional sports scene, receive one or more control signals from the controller and determine one or more control commands of one or more animated objects based on the one or more control signals, and use said calculated trajectory and said one or more control commands to generate updated image data including a simulation of said launched projectile into said three-dimensional sports scene and manipulate one or more animated objects associated with said three-dimensional sports scene, the updated image data associated with a sports result According to another aspect there is provided a sports simulation system comprising a projectile tracking apparatus configured to detect a projectile traveling through a projectile tracking region towards a display surface, a controller comprising one or more actuatable buttons, each actuatable button configured to communicate one or more control signals in response to actuation thereof, and at least one processing stage configured to receive data from the projectile tracking apparatus and process said data to calculate a trajectory of said projectile into a three-dimensional sports scene, receive one or more control signals from the controller and determine one or more control commands of one or more animated objects based on the one or more control signals, and use said calculated trajectory and said one or more control commands to generate updated image data including a simulation of said launched projectile into said three-dimensional sports scene and manipulate one or more animated objects associated with said three-dimensional sports scene, the updated image data associated with a sports result.

According to another aspect there is provided a method comprising presenting a three-dimensional sports scene on a display surface, the three-dimensional sports scene comprising one or more animated objects, detecting a projectile traveling through a projectile tracking region towards said display surface and calculating a trajectory of said projectile into said three-dimensional sports scene, determining one or more control commands of said one or more animated objects based on control signals received from a controller, and using said calculated trajectory and said one or more control commands to generate updated image data including a simulation of said launched projectile into said three-dimensional sports scene and manipulation of said one or more animated objects, the updated image data associated with a sports result.

According to another aspect there is provided a non-transitory computer readable medium having stored thereon a computer program comprising computer program code executable by one or more processors to perform a method comprising presenting a three-dimensional sports scene on a display surface, the three-dimensional sports scene comprising one or more animated objects, detecting a projectile traveling through a projectile tracking region towards said display surface and calculating a trajectory of said projectile into said three-dimensional sports scene, determining one or more control commands of said one or more animated objects based on control signals received from a controller, and using said calculated trajectory and said one or more control commands to generate updated image data including a simulation of said launched projectile into said three-dimensional sports scene and manipulation of said one or more animated objects, the updated image data associated with a sports result.

BRIEF DESCRIPTION OF THE DRAWINGS

Embodiments will now be described more fully with reference to the accompanying drawings in which.

DETAILED DESCRIPTION OF THE PREFERRED EMBODIMENT

Figure 1:
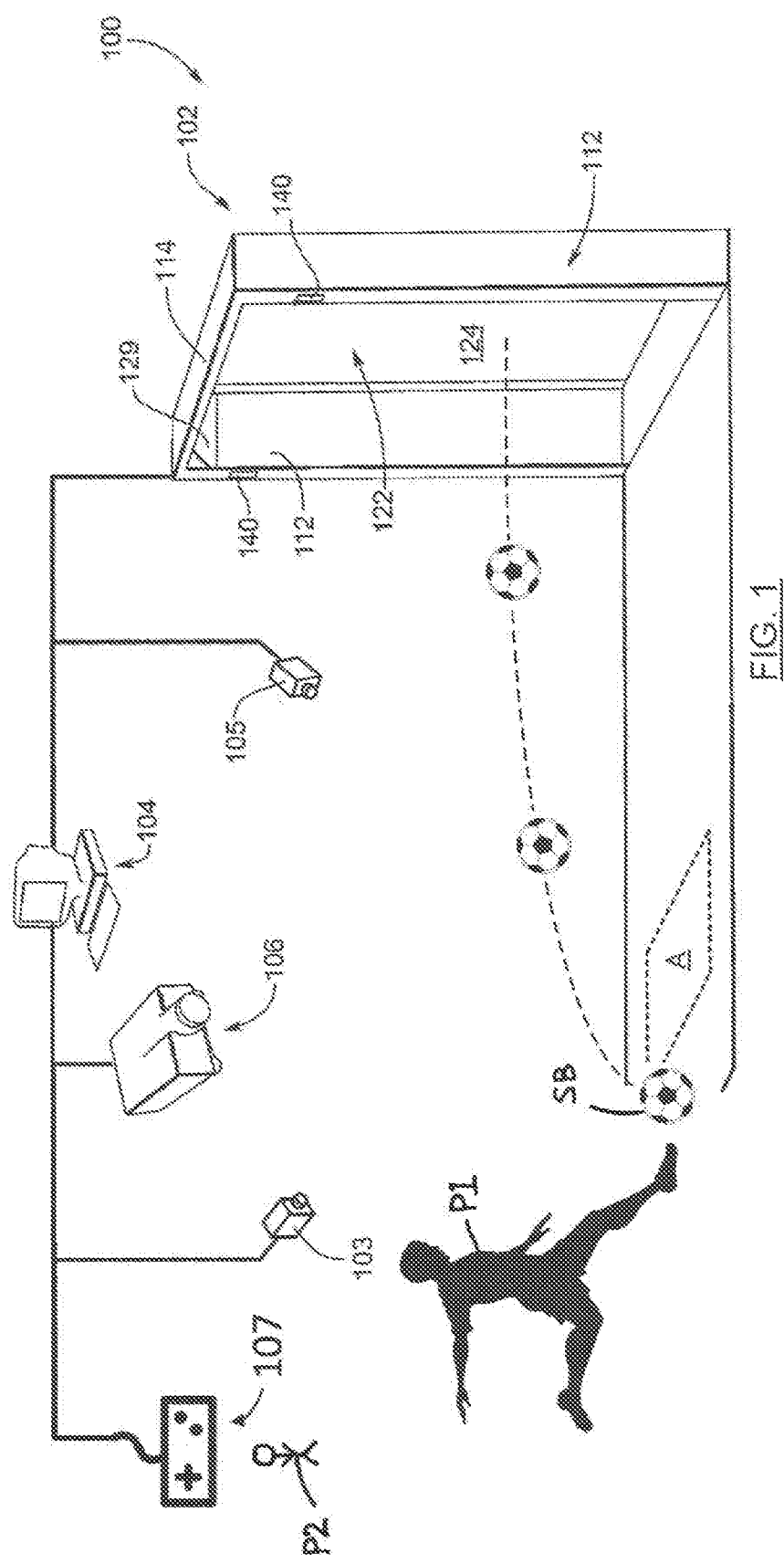
FIG. 1 is a perspective of a sports simulation system.
Figure 2:
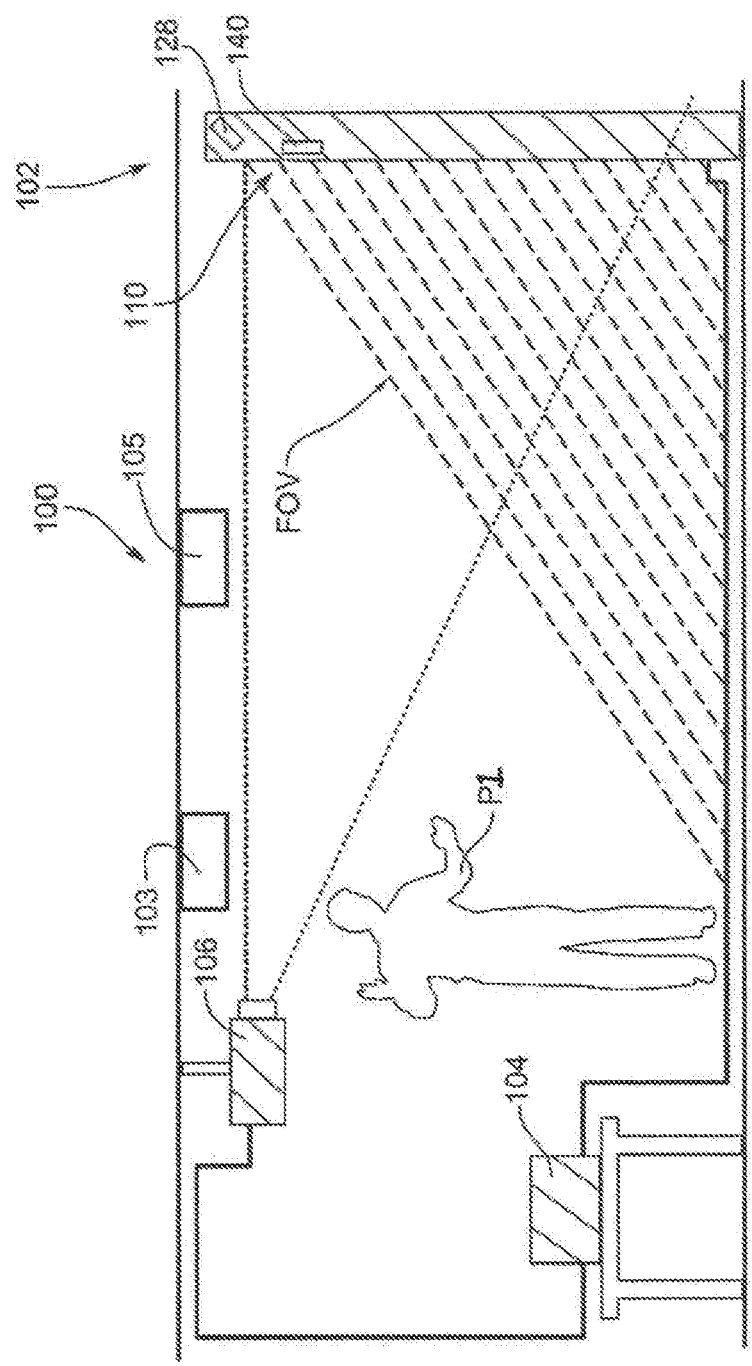
FIG. 2 is a side elevation view of the sports simulation system of FIG. 1.
Figure 3:
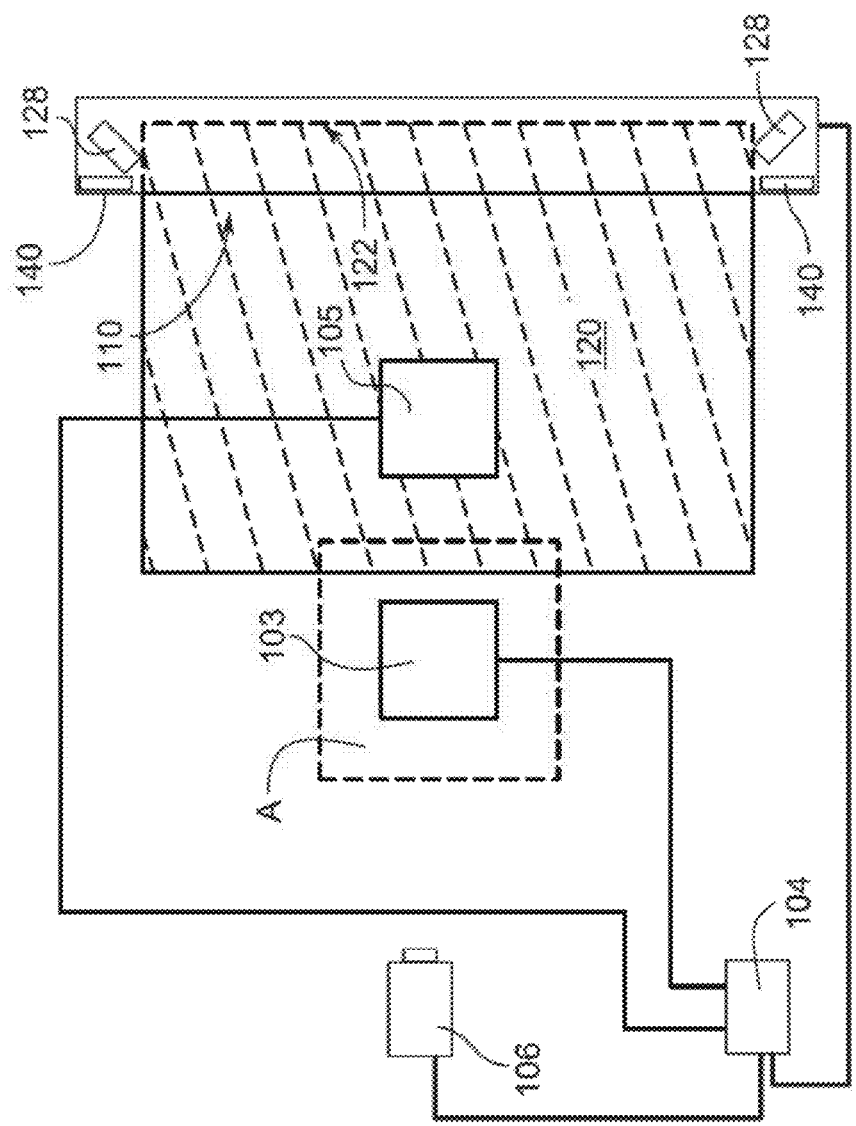
FIG. 3 is a top plan view of the sports simulation system of FIG. 1.
Figure 4:
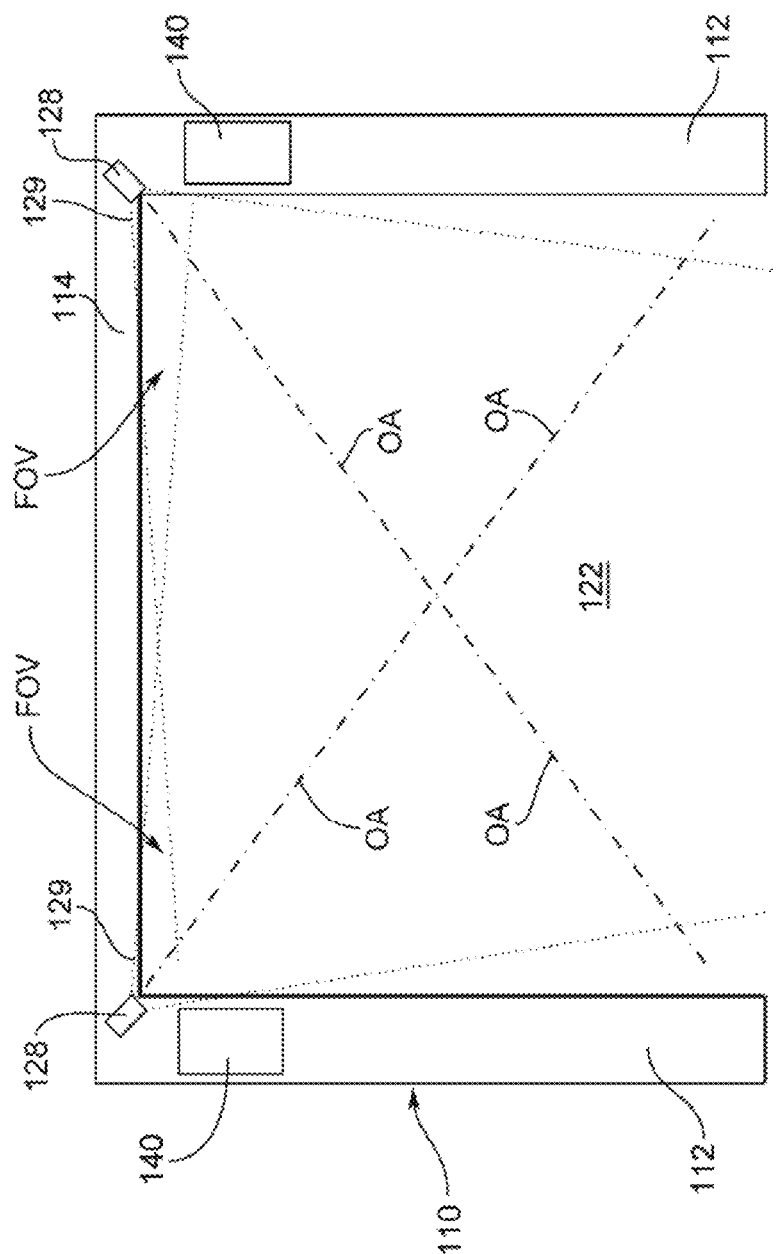
FIG. 4 is a front elevation view of a projectile tracking apparatus forming part of the sports simulation system of FIG. 1.
Figure 5:
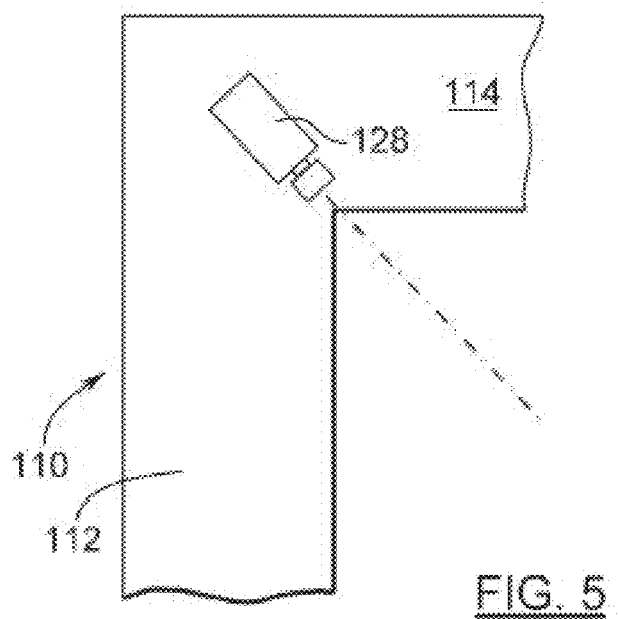
FIG. 5 is an enlarged front elevation view, partly in section, of a portion of the projectile tracking apparatus of FIG. 4.

Turning now to FIG. 1, a sports simulation system is shown and is generally identified by reference numeral 100. As can be seen, sports simulation system 100 includes a projectile tracking apparatus 102 disposed in front of a projectile launch or hitting area A in which a first player P1 stands. In this embodiment, the separation distance between the launch area A and the projectile tracking apparatus is approximately ten (10) feet. An overhead projectile launch area sensing unit 103 is disposed above the launch area A. An overhead projectile spin sensing unit 105 is positioned between the launch area A and the projectile tracking apparatus 102. A host computer 104 is coupled to the projectile tracking apparatus 102, the projectile launch area sensing unit 103 and the projectile spin sensing unit 105 via a high-speed serial data link and to a ceiling mounted front video projector 106 that is aimed at the projectile tracking apparatus 102. The host computer 104 outputs video image data to the projector 106, which in turn projects a video sequence on the projectile tracking apparatus 102. The video sequence portrays a three-dimensional sports scene including a target at which a projectile is to be launched and one or more animated objects. A controller 107 is coupled to the host computer 104. The controller 107 is used by a second player P2 to communicate commands to the host computer to manipulate the one or more animated objects. In this embodiment, the sports simulation system 100 simulates soccer and thus, the three-dimensional sports scene is soccer related and comprises an image of a soccer net. The projectile to be launched at the projectile tracking apparatus 102 of course is a soccer ball SB. The animated object manipulated by the controller 107 is a soccer goaltender.

The projectile tracking apparatus 102 outputs two-dimensional projectile position data to the host computer 104 when the launched soccer ball SB travels through a projectile tracking region monitored by the projectile tracking apparatus. The projectile launch area sensing unit 103 outputs image data representing the motion of the player's P1 leg through the launch area A before, during and after impact with the soccer ball to host computer 104. The projectile spin sensing unit 105 outputs image data to the host computer 104 that allows the host computer to determine the spin and the spin tilt axis of the soccer ball SB as the soccer ball SB travels through the projectile tracking region. The host computer 104 in turn processes the two-dimensional projectile position data, the projectile launch area sensing unit image data and the projectile spin sensing unit image data to determine the three-dimensional positions, launch velocity, acceleration, side spin, backspin, spin tilt axis and launch angle of the soccer ball SB so that the trajectory of the soccer ball SB can be accurately calculated. The calculated trajectory is then used to determine a sports result and to update the image data conveyed to the projector 106. As such, the presented video sequence shows a simulation of the soccer ball SB travel into the three-dimensional scene, movement of the animated soccer goaltender as well as the determined sports result.

FIGS. 2 to 5 better illustrate the projectile tracking apparatus 102. As can be seen, the projectile tracking apparatus 102 comprises an upright, inverted U-shaped frame 110 having a pair of side posts 112 and a crossbar 114 extending between the upper ends of the posts 112. A screen 122 is supported by the frame 110. In this embodiment, the screen 122 has a 4:3 aspect ratio making it particularly suited for displaying conventional television images. Those of skill in the art will however, appreciate that other image formats can be used. The screen 122 is loosely fastened to the back of the frame 110 at spaced locations.

The screen 122 includes multiple layers and is designed to reduce projectile bounce as well as enhance protection behind the screen. The first or front layer of the screen 122 is formed of highly reflective nylon having some elasticity to resist permanent stretching/pocketing and abrasion. As a result, the front layer provides an excellent display surface 124 on which images projected by the projector 106 are presented. The second or intermediate layer of the screen 122 is formed of soft and thick material and is designed to absorb projectile energy with reduced elastic effect thereby to inhibit stretching and or damage to the front layer. The third or back layer of the screen 122 is formed of a tough heavy canvas to which the intermediate layer can transfer energy. The back layer also inhibits excess deformation of the intermediate layer when contacted by a launched projectile. As a result, if the projectile tracking apparatus 102 is placed adjacent a wall surface or the like, the back layer protects the surface behind the screen 122 from projectile strike thereby to inhibit damage to the surface and/or significant projectile rebound. If a space is provided behind the projectile tracking apparatus 102, the back layer provides ample protection for the space.

Imaging devices, in this embodiment a pair of high speed digital cameras 128, are accommodated within the frame 110 with each camera being positioned adjacent a different top corner of the frame. Thus, the digital cameras 128 are positioned in front of the first player P1 and to the left side and right side of the anticipated projectile path. The digital cameras 128 are also angled to point downwardly and towards the first player P1's position so that the fields of view of the digital cameras are generally perpendicular and overlap in the projectile tracking region which extends from the projectile launch point to the screen 122. In this manner, the path of the projectile can be tracked generally continuously from its launch point until it impacts the screen 122 and then as it rebounds from the screen 122.

In this embodiment, each digital camera 128 has at least a 640 by 480 pixel array and includes built-in processing capabilities comprising field programmable gate arrays, a high performance 32-bit microprocessor and high speed memory. The distributed processing capabilities achieved by using the digital cameras 128 and the host computer 104 allow the digital cameras to be operated at very high frame rates thereby allowing multiple images of a fast moving projectile to be captured as the projectile travels through the projectile tracking region 120. This is due to the fact that the digital cameras 128 need only send data to the host computer 104 relating to images in which projectile motion has been detected allowing high speed projectiles to be tracked without excessive bandwidth between the host computer 104 and the digital cameras 128 being needed. For example, in the case of a projectile travelling through the projectile tracking region 120 at a speed of 200 miles per hour, the frame rates of the digital cameras 128 are selected such that at least four images of the projectile are captured by each digital camera 128. The viewing angles of the digital cameras 128 and the dimensions of the frame 110 are selected to provide the digital cameras 128 with a resolving accuracy of approximately 1 mm per pixel. As a result, a projectile such as a soccer ball will activate approximately 120 pixels per image. A smaller projectile such as a hockey puck or baseball will activate approximately 30 pixels. This resolving accuracy enables even very fast moving launched projectiles to be readily determined in captured images and as a result, reduces false projectile detection.

The on-board microprocessor of each digital camera 128 executes a motion detection routine to determine if a projectile exists in the captured images and if so, whether the projectile satisfies specified motion detection parameters defining a projectile characteristic signature. The projectile characteristic signature is used to ensure the detected projectile has characteristics matching the projectile in question, in this case, a struck soccer ball. The projectile can therefore be distinguished from other objects captured in the images such as for example, the first player P1's foot, show or leg. In this example, the projectile characteristic signature specifies allowable projectile size, shape, reflectivity and speed.

Infrared (IR) light emitting diode (LED) arrays (not shown) are also positioned within the posts 112 beside the digital cameras 128. The illumination axes of the IR LED arrays are generally coincident with the optical axes OA of the digital cameras. Each IR LED array emits IR radiation that is directed into the projectile tracking region 120. As the digital cameras 128 are responsive to both visible and infrared light, providing the background IR illumination allows the projectile tracking apparatus 102 to work well in a variety of ambient lighting conditions. In situations where a fast moving projectile is launched, the IR illumination allows for detection of the projectile without interfering with the visual quality of the displayed image presented on the screen 122.

Audio speakers 140 are provided on the posts 112 and are aimed forwardly toward the launch area A. The audio speakers 140 are driven by an audio amplifier (not shown) accommodated within the frame 110. The audio amplifier receives audio input from the host computer 104 during play that is conveyed to the audio speakers 140 for broadcast thereby to enhance the sports experience.

Figure 6:
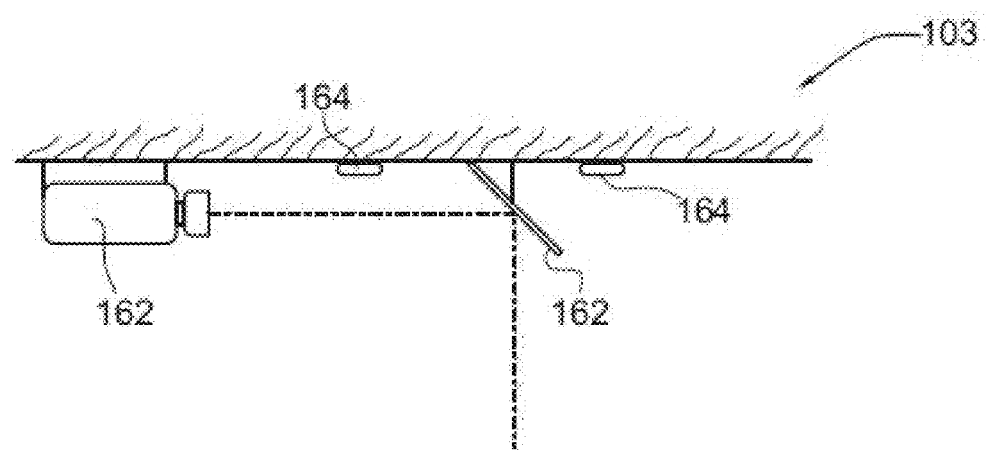
FIG. 6 is a side schematic view of a projectile launch area sensing unit forming part of the sports simulation system of FIG. 1.

The projectile launch area sensing unit 103 is disposed directly over the launch area A and comprises an area-scan digital camera 160, an angled mirror 162, a plurality of illuminators 164 in the form of halogen spotlights and a power supply (not shown) for the spotlights 164 as shown in FIG. 6. The spotlights 164 are aimed to provide sufficient illumination in the launch area A to permit image capture without adversely affecting visibility of the image projected on the screen 122. The area-scan digital camera 160 is ceiling mounted in a horizontal orientation approximately ten (10) feet above the launch area A. The optical axis of the digital camera 160 is generally in line with the center of the mirror 162 so that the field of view of the area-scan digital camera 160 is re-directed downwardly and centered over the launch area A. In this embodiment, the field of view of the area-scan digital camera 160 encompasses a three (3) foot by three (3) foot region.

Similar to the digital cameras 128 in the projectile tracking apparatus 102, the area-scan digital camera 160 comprises an on-board processor that executes a motion detection routine. During execution of the motion detection routine, as images are captured by the area-scan digital camera 160, the images are examined to determine if one or more moving objects exist therein that satisfy specified motion parameters. In this example, the motion parameters are selected to allow the on-board processor of the area-scan digital camera 160 to detect when either a moving foot or moving soccer ball or both is in captured images. Captured images including one or more moving objects satisfying the specified motion parameters are sent to the host computer 104 for further processing.

Figure 7:
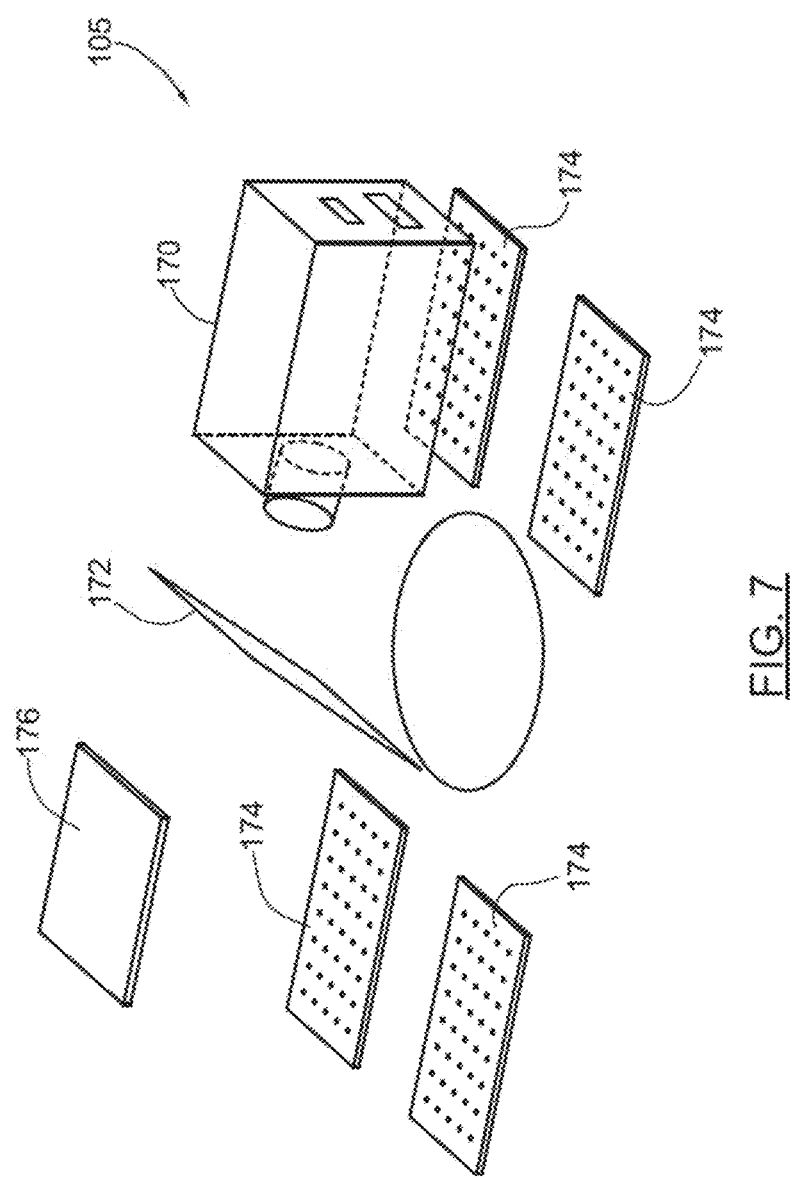
FIG. 7 is a schematic perspective view of a projectile spin sensing unit forming part of the sports simulation system of FIG. 1.

The projectile spin sensing unit 105 comprises a ceiling mounted, horizontally oriented area-scan digital camera 170, an angled mirror 172, a plurality of infrared (IR) illuminator boards 174 and a driver 176 for the illuminator boards 174 as shown in FIG. 7. The optical axis of the digital camera 170 is generally in line with the center of the mirror 172 so that the field of view of the digital camera 170 is re-directed and centered over a region that at least partially overlaps with the projectile tracking region. In this embodiment, the region extends from the front of the launch area A towards the projectile tracking apparatus 102 and encompasses a three (3) foot by six (6) foot region.

Figure 8:
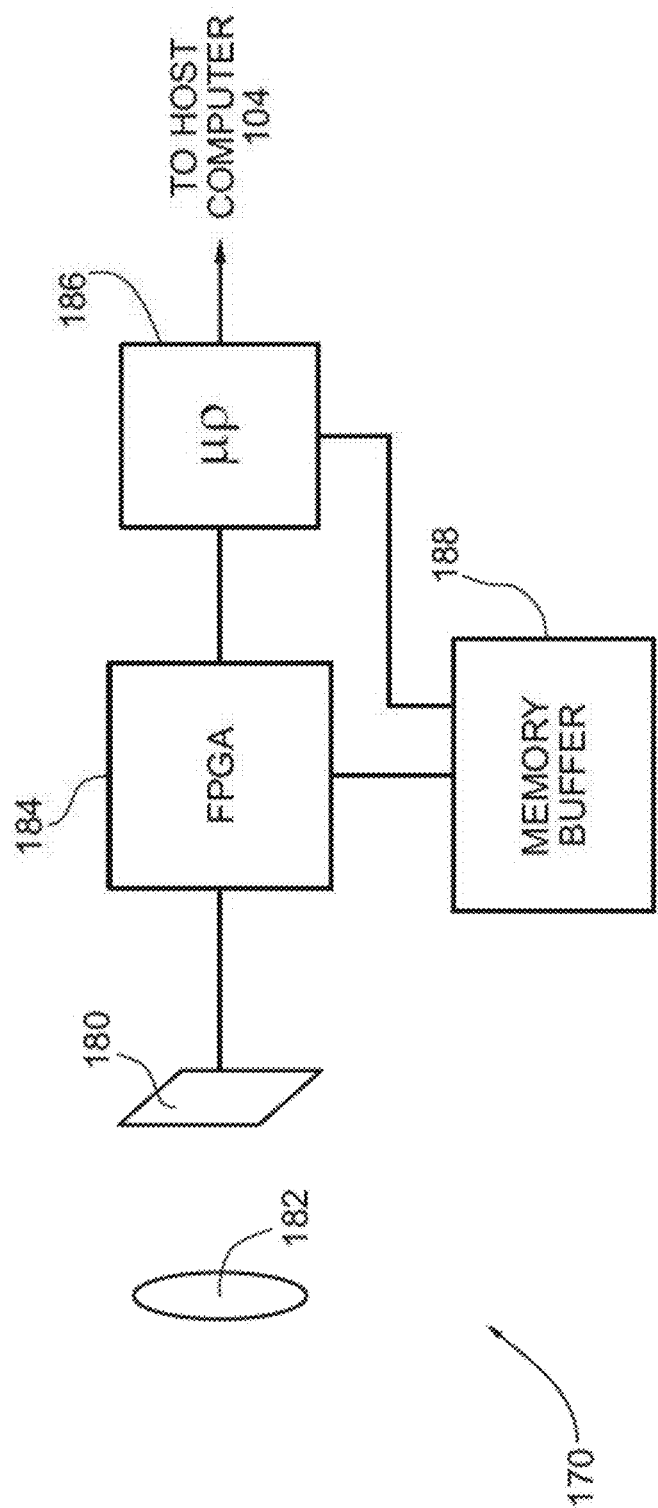
FIG. 8 is a schematic block diagram of an area-scan digital camera forming part of the projectile spin sensing unit of FIG. 7.

FIG. 8 better illustrates the area-scan digital camera 170. In this embodiment, the digital camera 170 comprises a CMOS image sensor 180 having a 640 by 480 pixel array and a pixel size equal to about 9.9 microns. The image sensor 180 looks through a lens 182 having a focus distance of about twelve (12) millimeters. Such a lens has been found to provide good area coverage while maintaining sufficient resolution. The digital camera 170 includes built-in processing capabilities comprising a field programmable gate array (FPGA) 184, a high performance microprocessor 186 and a high speed memory buffer 188.

Figure 9:
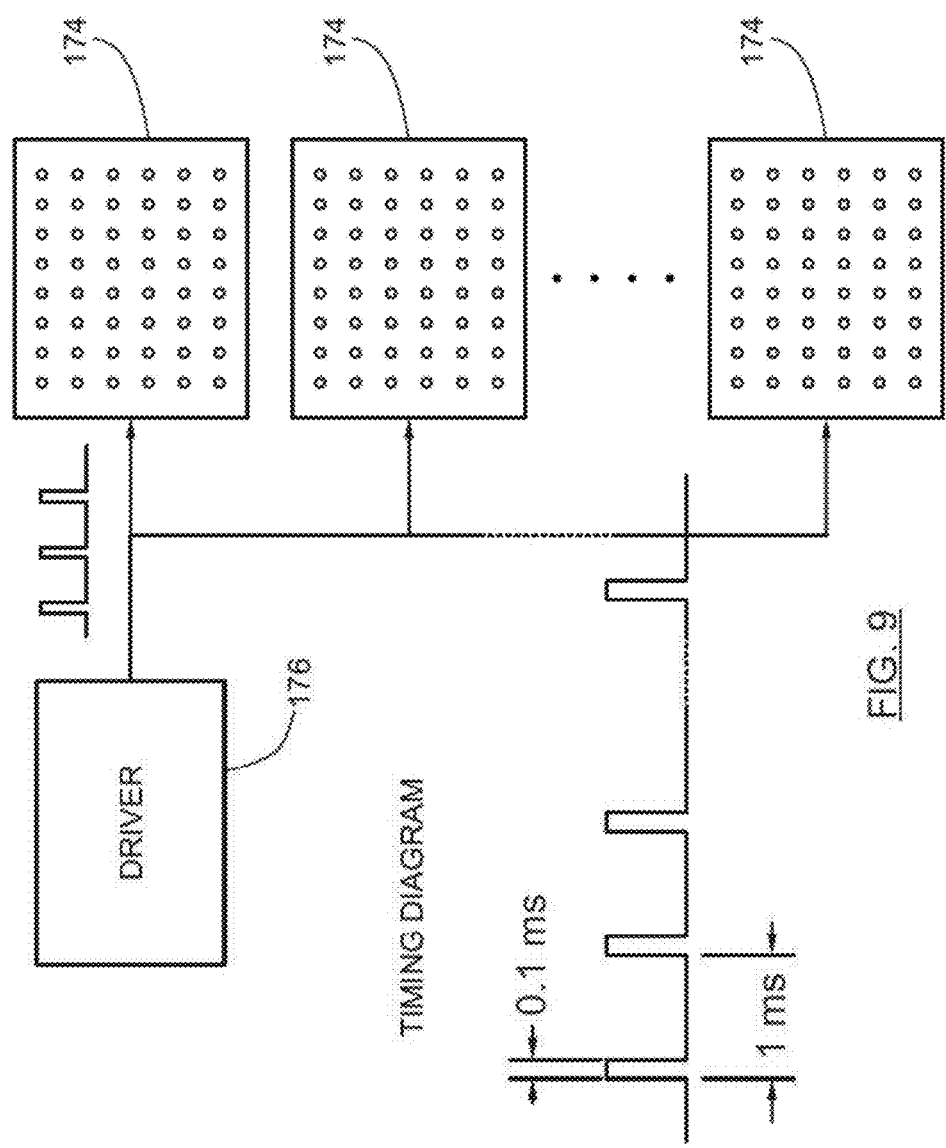
FIG. 9 is a schematic block diagram of an illumination board driver and illumination boards forming part of the projectile spin sensing unit of FIG. 7.

In this embodiment, the projectile spin sensing unit 105 comprises four (4) illuminator boards 174, with each illuminator board comprising an array of light emitting diodes (LEDs). The illuminator boards 174 are arranged in a manner so that the region within the field of view of the digital camera 170 is generally evenly illuminated when the LEDs of the illuminator boards 174 are on. The driver 176 comprises a pulse generator that drives each of the illuminator boards 174 simultaneously so that the LEDs of the illuminator boards 174 turn on and off in unison at regular intervals. In this embodiment, the LEDs of the illuminator boards 174 remain in the on state for a 0.1 millisecond duration and remain in the off state for a 1 millisecond duration as shown in FIG. 9.

The projector 106 preferably has a resolution of at least 800×600, at least 1200 ANSI Lumens brightness, a short throw lens, vertical 'keystone' correction, and the capacity to accept digital RGB computer video signals, and NTSC/PAL baseband television video signals. Projectors having this set of features include the Epson Powerlite 820P, the Toshiba TDP-DI-US, the InFocus LP650 and the Sanyo XP30 for example.

The host computer 104 is a programmed computing device. In this embodiment, host computer is an IBM compatible personal computer including an Intel Pentium® processor, at least 1 GB SDRAM, a high-speed hard drive, and a DVD player. The host computer 104 also includes a display adapter assembly including a reconfigurable 32-bit video memory buffer partitioned into three separate buffers. One of the buffers is used to store primary foreground image data representing one or more independent foreground action elements if appropriate for the sports scene being displayed. A second of the buffers is used to store background image data and the third buffer is used to store projectile trajectory image data. The display adapter assembly treats the foreground action, background and projectile trajectory image data as overlay image planes that are combined seamlessly to generate the video image data that is output to the projector 106. The overlay image planes are non-destructive so that when a foreground action element and/or projectile moves over an underlying image plane it is not necessary to redraw the underlying image plane. To reduce peak processing requirements, the host computer 104 updates the background image data less frequently than the foreground image data. The host computer 104 provides the output video image data to the projector 106 on a video output channel. The host computer 104 receives external video feeds on a television/satellite/cable input channel, a video game input channel and an Internet input channel.

The host computer 104 is mounted within a protective enclosure (not shown) having external connectors to enable the host computer 104 to be coupled to the projector 106, the projectile tracking apparatus 102, the projectile launch area sensing unit 103 and the projectile spin sensing unit 105. The enclosure also includes external connectors to allow the host computer 104 to receive the television/satellite/cable, external video game and Internet feeds. An interactive touch screen is also provided on the enclosure to allow a player to interact with the host computer 104.

A high speed digital interface, such as for example IEEE1394 or gigabit Ethernet, is used for communications between the host computer 104, the projectile tracking apparatus 102, the projectile launch area sensing unit 103 and the projectile spin sensing unit 105. Using this standard interface provides a low cost, high performance solution while avoiding use of expensive analog frame grabbers.

Figure 10:
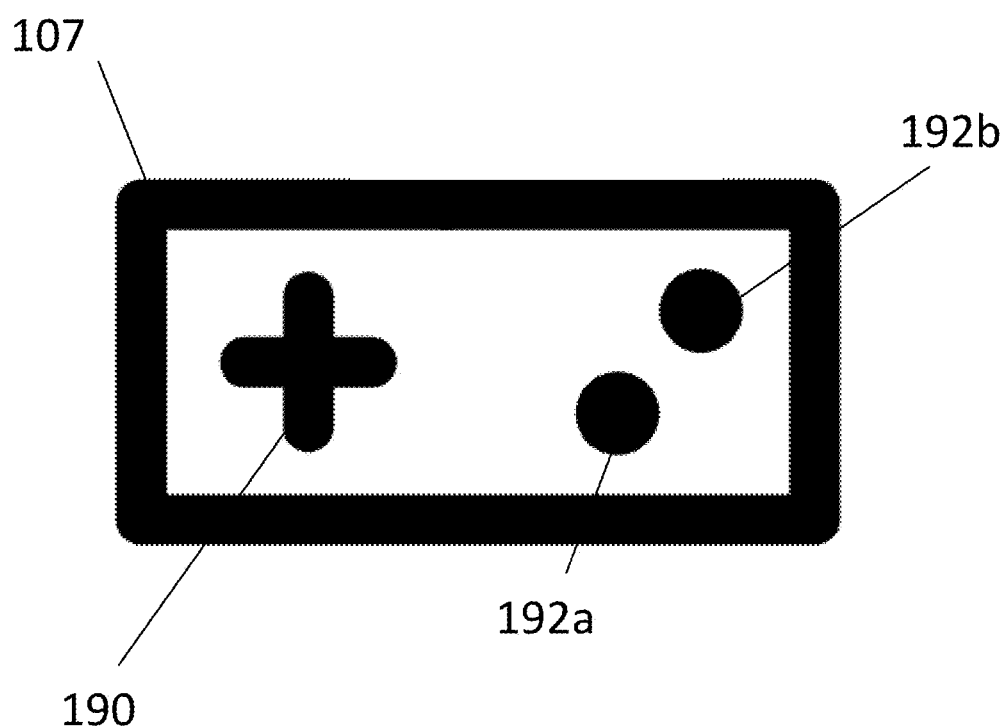
FIG. 10 is a schematic view of a controller forming part of the sports simulation system of FIG. 1.

The controller 107 is shown in FIG. 10. In this embodiment, the controller 107 is a human interface device (HID) in the form of a video game controller. The controller 107 is wirelessly coupled to the host computer 104 and communicates command signals thereto via Bluetooth™. In this embodiment, the controller 107 comprises a directional pad 190 actuatable by a user to communicate signals to the host computer 104 to control a direction of movement of the one or more animated objects. The controller also comprises buttons 192a and 192b actuatable by the second player P2 to communicate signals to the host computer 104 to control one or more actions of the one or more animated objects. As will be appreciated, the controller 107 may be any type of video game controller such as for example a joystick, a Sony Playstation™ controller, a Nintendo™ controller, a Microsoft Xbox™ controller, etc. The controller 107 may be any type of HID such as for example a keyboard, a mouse, etc.

The host computer 104 executes sports simulation software stored in the SDRAM. In this example, the sports simulation software includes a soccer simulation module that requires the first player P1 to hit the soccer ball SB at the screen 122 of the projectile tracking apparatus 102 in response to the video sequence displayed on the screen 122. The soccer simulation module allows the second player P2 to manipulate, using the controller 107 an animated soccer goaltender in response to the first player P1 hitting the soccer ball SB at the screen 122 in an attempt to make a soccer goaltender save.

Figure 12:
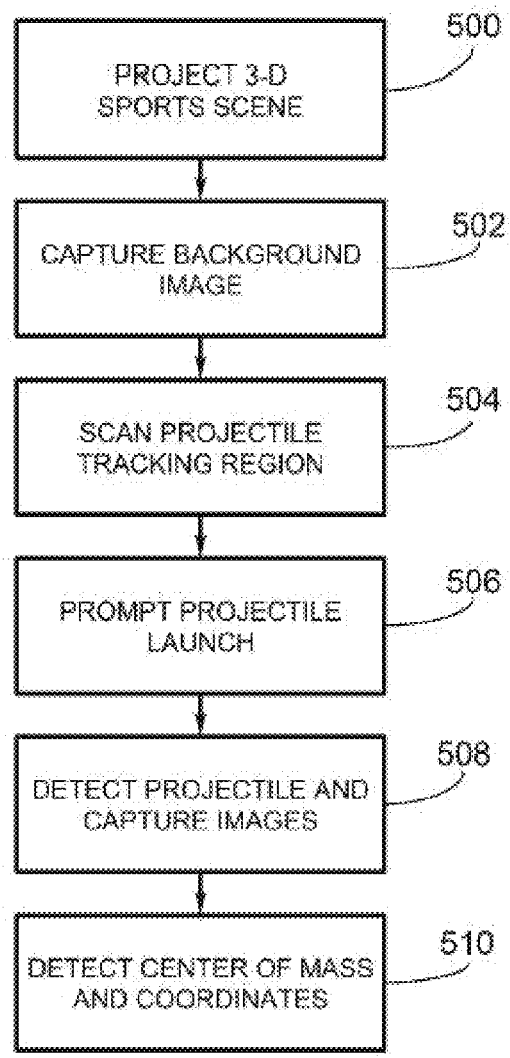
FIGS. 12 to 14b are flowcharts showing steps performed during player interaction with the sports simulation system of FIG. 1.

During training, practice or game play, the host computer 104 outputs video image data to the projector 106 causing the projector 106 to project a video sequence portraying a three-dimensional sports scene on the display surface 124 that includes a target at which the projectile is to be launched (see step 500 in FIG. 12). In this embodiment, the three-dimensional sports scene is a soccer field and the target is a soccer net. An animated object in the form of a soccer goaltender is displayed on the display surface 124 and is configured to be manipulated via commands received from the controller 107. The host computer 104 also conditions the digital cameras 128 to capture a background image of the projectile tracking region 120 devoid of a projectile (step 502) and then scan the projectile tracking region to look for the presence of a launched projectile at a very high frame rate (step 504). The player P1 is then prompted to launch the soccer ball SB at the screen 122 (step 506). At this stage, the digital cameras 128, the area-scan digital camera 160 and the area-scan digital camera1 170 are conditioned to capture and process images.

Figure 11:
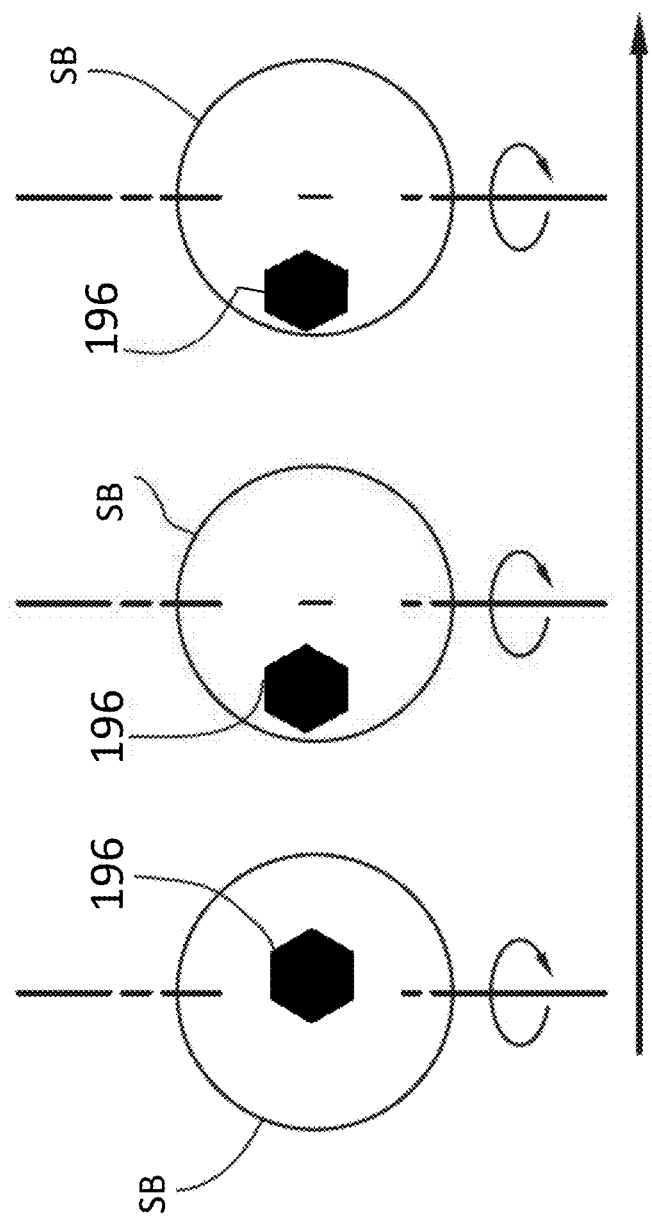
FIG. 11 shows a spinning launched soccer ball.

To facilitate detection of soccer ball spin, one or more identifying features are tracked on the soccer ball SB (see FIG. 11). In this embodiment, the one or more identifying features are dark panels 196 forming part of the pattern on the soccer ball SB. After launch and while the soccer ball SB spins as it travels through the field of view of the area-scan digital camera 170, the one or more identifying features are visible to the area-scan digital camera 170 at intervals.

When the first player P1 launches the projectile at the projectile tracking apparatus 102 by striking the soccer ball SB with their foot and the projectile enters the projectile tracking region 120, the projectile appears in the images captured by the digital cameras 128. Thus, the digital cameras 128 generally synchronously capture a series of images of the projectile as it travels from its launch point through the projectile tracking region 120 to its contact point with the screen 122 and then as the projectile rebounds off of the screen (step 508). The captured images are in turn processed by the on-board processors of the digital cameras 128 to determine if the captured images include a detected projectile satisfying the projectile characteristic signature.

If the detected projectile satisfies the projectile characteristic signature, the images are further processed to determine the center of mass of the projectile in each image and its position in rectangular coordinates (step 510). As a result, a series of two-dimensional rectangular coordinates representing the two-dimensional positions of the projectile as it travels through the projectile tracking region 120 relative to each digital camera 128 is generated. The two-dimensional rectangular coordinates generated by the digital cameras 128 are in turn conveyed to the host computer 104.

The area-scan digital camera 160 of the projectile launch area sensing unit 103 captures and processes images to look for the existence of a moving foot or leg passing through the launch area A and the launched soccer ball SB exiting the launch area A. When a moving foot or leg and launched soccer ball SB are detected, the area-scan digital camera 160 outputs the captured images to the host computer 104.

The area-scan digital camera 170 of the projectile spin sensing unit 105 captures images at a frame rate equal to about 100 frames per second (fps) and processes consecutive images to determine if the difference between consecutive images exceeds a threshold signifying the existence of an object in motion. When the difference between consecutive images exceeds the threshold, images are further processed to determine if the object in motion resembles a soccer ball. If the object in motion resembles a soccer ball, the images are sent to the host computer 104 for further processing.

Figure 13:
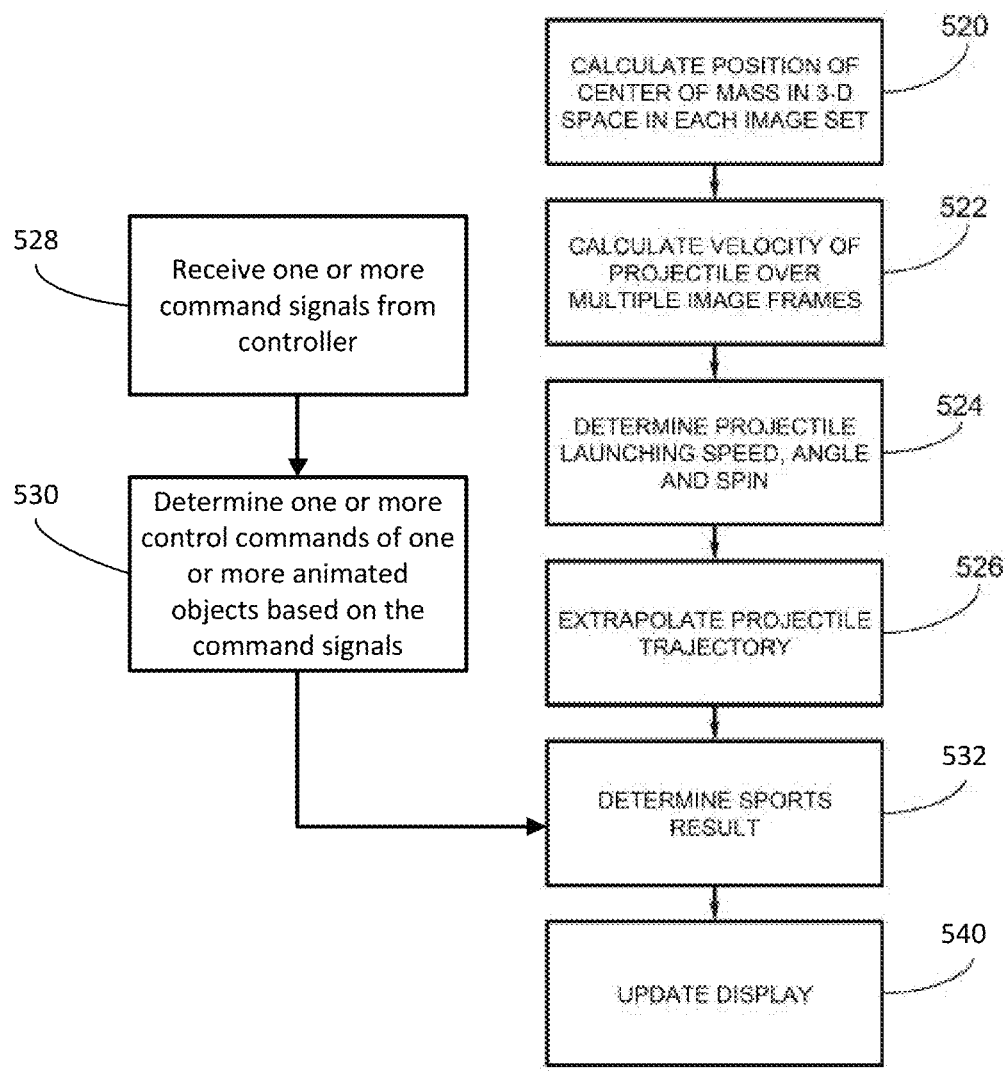

Upon receipt of the projectile coordinates from the projectile tracking apparatus 102, the host computer 104 calculates the positions of the projectile's center of mass in three-dimensional space throughout its travel through the projectile tracking region 120 including its collision and rebound with the screen 122 using triangulation techniques (see step 520 in FIG. 13). With the position of the projectile in three-dimensional space known during its travel through the projectile tracking region 120 and knowing the frame rates of the digital cameras 128, the host computer 104 calculates the launch velocity of the projectile and the velocity of the projectile over each image frame (step 522). The host computer 104 then compares each calculated velocity with the previously calculated velocity to determine the acceleration of the projectile (step 524).

Figure 14A:
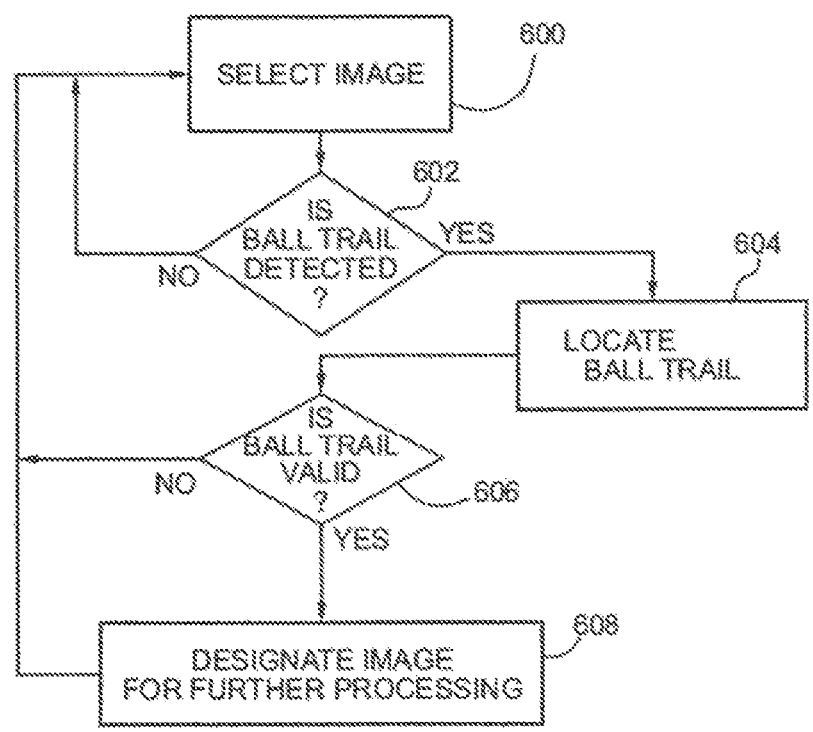
Figure 15:
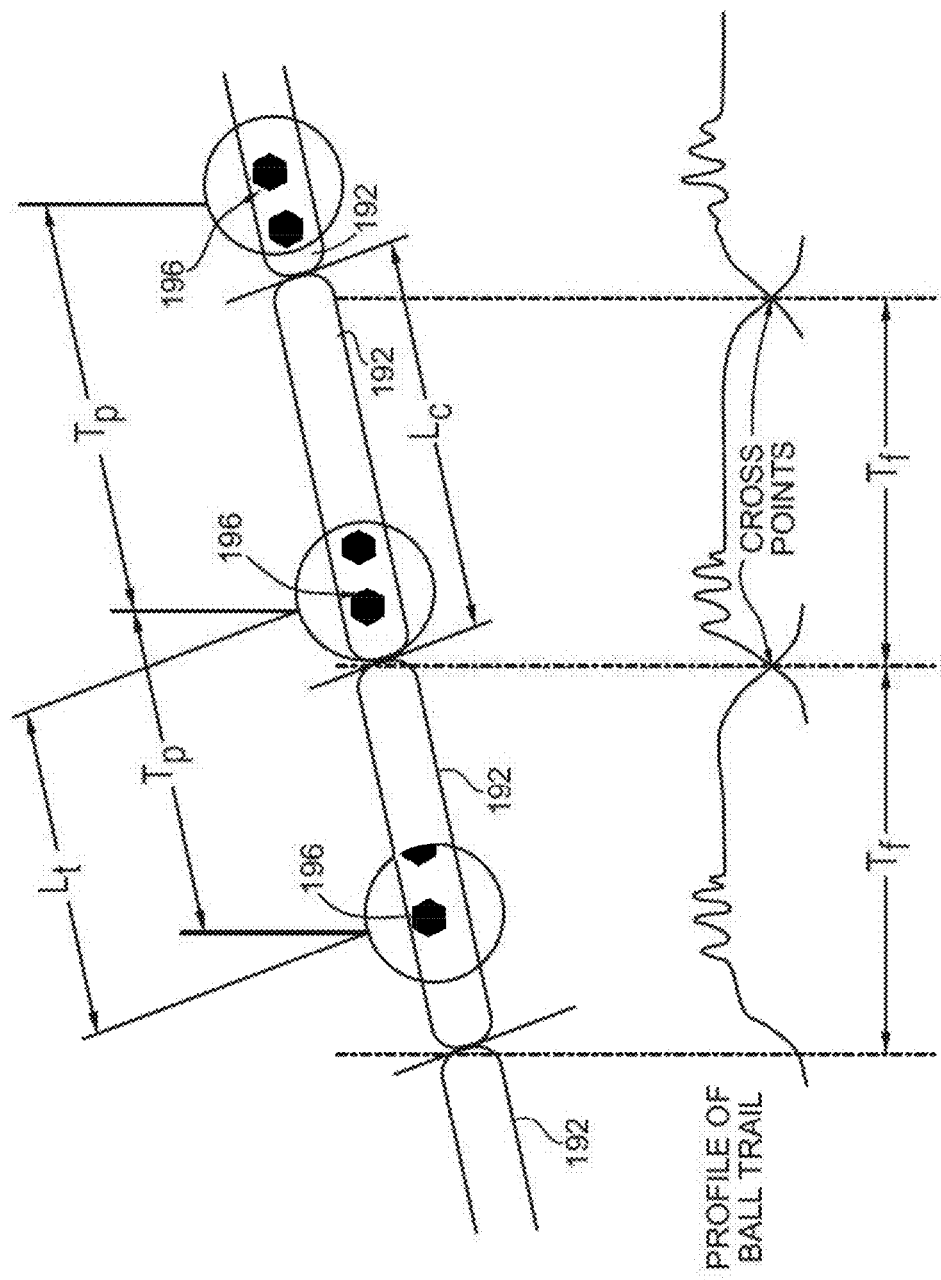
FIG. 15 shows processing of captured images to determine soccer ball spin and soccer ball spin tilt axis.

Upon receipt of the images from the projectile spin sensing unit 105, the host computer 104 selects the first image (see step 600 in FIG. 14a) and analyses the image to determine if the image includes a soccer ball trail 192 (step 602) as shown in FIG. 15. The soccer ball trail 192 appears in images due to the fact that velocity of the soccer ball SB exceeds the frame rate of the digital camera 170. If the image does not include a soccer ball trail, the image is discarded and the next image is selected at step 600. If the selected image includes a soccer ball trail 192, the soccer ball trail in the image is located (step 604) and is then examined to determine if it is valid (step 606). In particular, the length and width of the soccer ball trail are compared with the threshold ranges. If the soccer ball trail is not valid, the selected image is discarded and the next image is selected at step 600. If the soccer ball trail 192 is validated at step 606, the image with the valid soccer ball trail is designated for further processing (step 608) and the process reverts back to step 600 where the next image is selected.

Figure 14B:
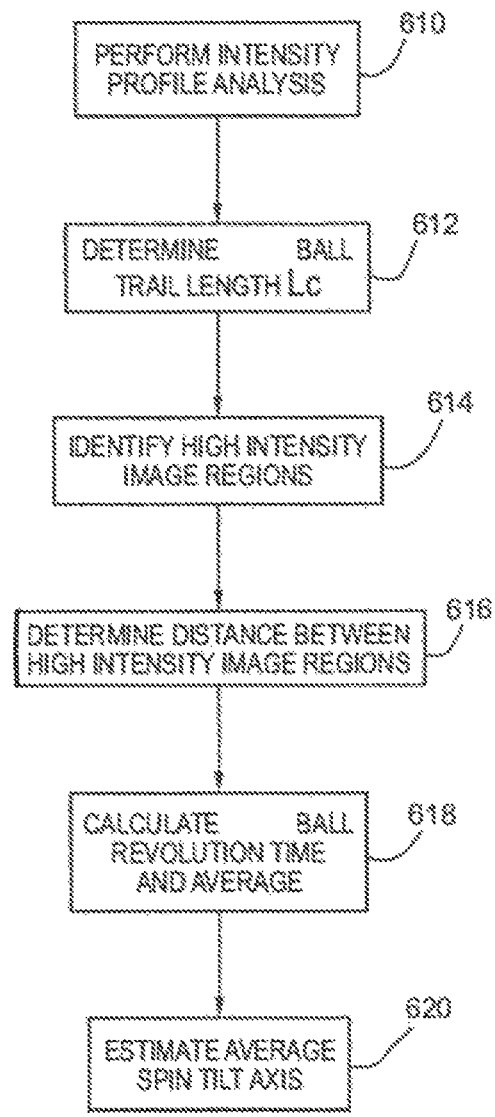

Once all of the images from the projectile spin sensing unit 105 have been selected and processed, the images designated for further processing at step 608 are subjected to an image intensity profile analysis (step 610 in FIG. 14b) thereby to generate a combined profile of the soccer ball trail over consecutive images as shown in FIG. 15. The soccer ball trail length $L_c$ per image is determined by the cross points of the combined profile (step 612). The images are analyzed to identify the one or more identifying features 196 of the soccer ball SB. A group of identifying features 196 corresponding to the dark panels on the soccer ball appear in each image due to the soccer ball spin. The distance between the group of identifying features 196 is then determined and is represented by $L_t$ in FIG. 15 (step 616). The time $T_p$ taken for the soccer ball SB to make a single revolution is expressed as:

$$T_p = \frac{L_t}{L_c} \cdot T_F$$

where $T_f$ is the frame rate of the digital camera 170.

The time $T_p$ is calculated for each consecutive image designated for further processing at step 608 and the average single rotation time for the soccer ball SB to make a signal revolution is determined (step 618). The average single rotation time is then converted into convenient units such as for example rotations per minute (rpms).

The soccer ball spin tilt axis is then estimated for each image using the orientation of the one or more identifying features in each group and the relative angle between the longitudinal axis of the one or more identifying features and the longitudinal axis of the soccer ball trail 192. The average soccer ball spin tilt axis over the consecutive images designated for further processing at step 608 is then determined (step 620).

With the three-dimensional positions, launch velocity, acceleration, side spin, launch angle, backspin and spin tilt axis of the projectile known, the host computer 104 extrapolates an accurate trajectory for the projectile allowing a realistic simulation of curved and/or arcing projectiles to be generated, and the computed projectile trajectory is used to compute the intersection of the calculated projectile trajectory with the displayed video image (step 526).

While the host computer 104 executes steps 520 to 526, the host computer 104 receives command signals from the controller 107 (step 528). The command signals are processed to determine one or more control commands of one or more animated objects (step 530).

Figure 16:
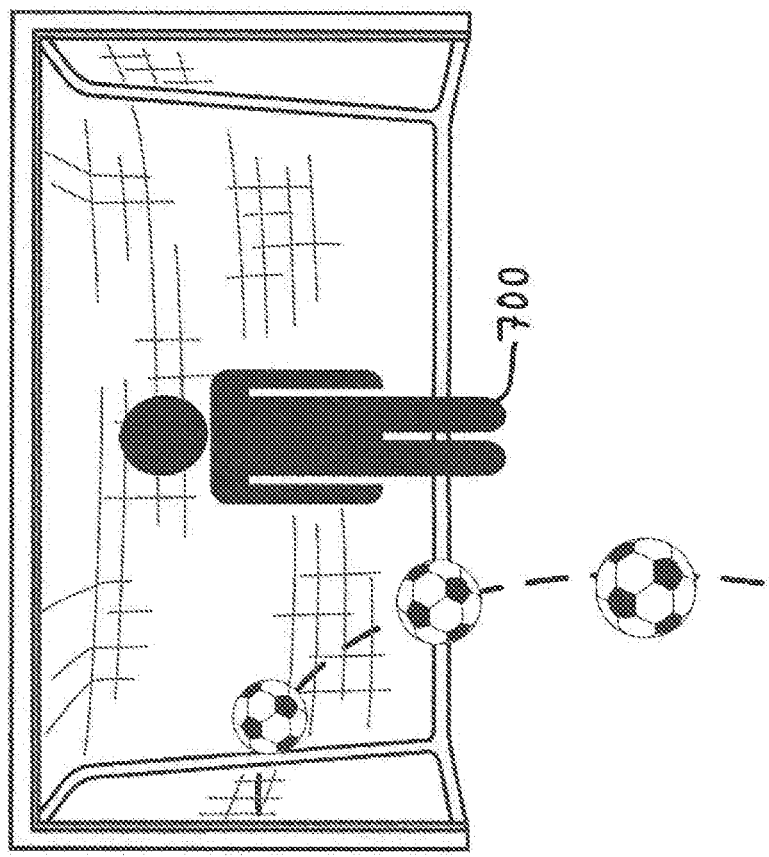
FIG. 16 is an exemplary three-dimensional sports scene.

A sports result is determined using the computed projectile trajectory and the one or more command signals (step 532). Using the calculated trajectory and the one or more control commands, the host computer 104 updates the image data that is conveyed to the projector 106 so that the video sequence displayed on the display surface 124 of the screen 122 shows the simulated flight of the projectile, the movement of the animated soccer goaltender and the sports result (step 540). During video sequence display, when a simulation of the projectile flight is shown a graphical duplicate of the projectile is projected onto the display surface 124 of the screen 122 that begins its flight from the impact point of the projectile with the screen 122. As shown in FIG. 16, the projectile appears to continue its trajectory into the video scene thereby to achieve a realistic video effect. The one or more animated objects 700, which in this embodiment is an animated soccer goaltender, moves in the video scene in response to the control commands. In the event that at least a portion of the animated soccer goaltender is positioned in between the soccer net and the simulated flight of the projectile, the video sequence is updated to show a soccer goaltender save. In the event that the animated soccer goaltender is not positioned in between the soccer net and the simulated flight of the projectile, the video sequence is updated to show a soccer goal. The three-dimensional scene is then updated in accordance with the sports result, allowing game play or practice to continue.

Although the sports simulation system 100 has been described as including a ceiling mounted front projector 106 in combination with a screen 122, those of skill in the art will appreciate that alternative projection devices may be used. For example, a rear video projector may be used to project images onto the rear surface of the display screen 122.

Those of skill in the art will appreciate that the projectile tracking apparatus 102 may include imaging devices at different locations to view the projectile tracking region and detect the existence of a launched projectile. Those of skill in the art will also appreciate that the number of processing stages may be increased or decreased as desired to handle processing of the digital camera image data effectively in real-time and provide a realistic projectile simulation.

If desired, the projectile launch area sensing unit 103 and the projectile spin sensing unit 105 may include additional cameras. The projectile launch area sensing unit 103 and projectile spin sensing unit 105 may include any number of illuminators or none at all if the ambient light conditions are sufficient to provide for adequate image capture. Further, although the projectile launch area sensing unit 103 and projectile spin sensing unit 105 are shown to include mirrors to re-direct the fields of view of the area-scan digital cameras 160 and 170, those of skill in the art will appreciate that the area-scan digital cameras may be oriented to look directly at the regions of interest. The projectile launch area sensing unit 103 and projectile spin sensing unit 105 may also be positioned at any convenient location.

In some embodiments, the identifying features may be retro reflective tape positioned on the projectile.

While the sports simulation system is described as simulating soccer, it will be appreciated that the sports simulation system may be used to simulate other sports where a projectile is launched. In such cases, the projectile characteristic signatures are updated to enable launched projectiles to be accurately tracked. For example, in another embodiment the sports simulation system may simulate baseball. In this embodiment the projectile is a baseball or softball. The controller may be used by the second player P2 to manipulate an animated baseball batter in an attempt to hit the baseball pitched by the first player P1. In another embodiment, the sports simulation system may simulate hockey. In this embodiment, the projectile is a hockey puck. The controller may be used by the second player P2 to manipulate an animated hockey goaltender in an attempt to make a hockey goaltender save in response to the hockey puck being shot by the first player P1.

Although embodiments have been described where the area-scan digital camera captures and processes images, those skilled in the art will appreciate that the processing may be done at the host computer. In this embodiment, the area-scan digital camera captures images in the form of image data and communicates the image data to the host computer for processing.

Although the controller is described as being coupled to the host computer via Bluetooth, those skilled in the art will appreciate that the controller may be coupled to the host computer using any suitable wireless protocol. In other embodiments, the controller may be coupled to the host computer using a Universal Serial Bus (USB) cable, a High-Definition Multimedia Interface (HDMI) cable, or other suitable wire connector.

Although embodiments have been described above with reference to the drawings, those of skill in the art will appreciate that variations and modifications may be made without departing from the scope thereof as defined by the appended claims.

What is claimed is:

1. A multi-player sports simulation system comprising:
   a projectile tracking apparatus configured to detect a projectile that is physically launched by a first player and travels through a projectile tracking region towards a display surface;
   a controller comprising one or more actuatable buttons, each actuatable button configured to communicate one or more control signals in response to actuation thereof by a second player;
   at least one processing stage configured to:
     receive data from the projectile tracking apparatus and determine three-dimensional positions, velocity and acceleration of a detected launched projectile traveling through said projectile tracking region, the three-dimensional positions, velocity and acceleration used by said at least one processing stage to calculate a trajectory of said launched projectile into a three-dimensional sports scene;
     receive one or more control signals from the controller and determine one or more control commands for one or more animated objects based on the one or more control signals; and
     use said calculated trajectory and said one or more control commands to generate updated image data for display including a simulation of said launched projectile into said three-dimensional sports scene and the one or more animated objects as manipulated by said one or more control commands, the updated image data associated with a sports result; and
   a projectile spin sensing unit configured to capture images of a region at least partially overlapping with said projectile tracking region, each captured image comprising a projectile trail representing a travel path of said projectile when a projectile is present in said region during image capture,
   wherein said at least one processing state is further configured to:
     receive data from the projectile spin sensing unit and to determine spin of the detected launched projectile, the spin used by said at least one processing stage to calculate said trajectory of said launched projectile into said three-dimensional sports scene;
     generate a profile of the projectile travel path over a plurality of images;

determine the projectile travel path length per image of said plurality of images;

identify regions corresponding to one or more markings on said projectile;

determine the distance between the regions in each image, calculate the spin rate and tilt of the projectile using the determined distance, the projectile travel path length and image capture frame rate; and estimate a spin tilt axis of the projectile using the orientation of the regions in each image and the relative angle between the longitudinal axis of the regions and the longitudinal axis of the projectile travel path.

2. The sports simulation system of claim 1 wherein said projectile tracking apparatus comprises at least two imaging devices capturing images of said projectile tracking region from different vantages.

3. The sports simulation system of claim 1 wherein the one or more control commands are associated with controlling movement of the one or more animated objects within the three-dimensional sports scene.

4. The sports simulation system of claim 1 wherein the one or more control commands are associated with controlling an action of the one or more animated objects within the three-dimensional sports scene.

5. The sports simulation system of claim 1 further comprising a projection device coupled to said at least one processing stage, said projection device configured to receive the updated image data from said at least one processing stage and present said three-dimensional sports scene, said simulation, and said one or more animated objects as manipulated by said one or more control commands on said display surface.

6. The sports simulation system of claim 5 wherein said projectile tracking apparatus includes a frame and at least one pair of camera devices mounted on said frame, said camera devices configured to have overlapping fields of view looking across and in front of said display surface and to capture images of said projectile tracking region.

7. The sports simulation system according to claim 6 wherein said camera devices have generally perpendicular fields of view looking across and in front of said display surface from adjacent opposite corners of said frame.

8. The sports simulation system of claim 7 wherein each camera device is configured to examine captured images to detect pixel clusters resembling a projectile characteristic signature thereby to detect said projectile in said captured images.

9. The sports simulation system of claim 1 further comprising an audio system configured to broadcast audio.

10. The sports simulation system of claim 1 further comprising a launch area sensing unit configured to capture images of a region in which said projectile is physically launched by said first player.

11. The sports simulation system of claim 1 wherein the controller is wirelessly coupled to the at least one processing stage.

12. The sports simulation system of claim 1 wherein said three-dimensional sports scene is a soccer pitch including a net, said projectile is a soccer ball kicked by said first player, said one or more animated objects is an animated soccer goaltender and said sports result is one of a scored goal and a goalie save.

13. The sports simulation system of claim 1 wherein said three-dimensional sports scene is a baseball diamond, said projectile is a baseball thrown by said first player, said one or more animated objects is an animated baseball batter and said sports result is one of a hit, a strike and a ball.

14. The sports simulation system of claim 1 wherein said three-dimensional sports scene is a hockey rink including a net, said projectile is a hockey puck shot by said first player, said one or more animated objects is an animated hockey goaltender and said sports result is one of a goaltender save and a scored goal.

15. A multi-player sports simulation system comprising:

a projectile tracking apparatus configured to detect a projectile, physically launched by a first player, as the launched projectile travels through a projectile tracking region towards a display surface, the projectile tracking apparatus comprising at least one pair of imaging devices having overlapping fields of view at least encompassing the projectile tracking region and configured to capture images;

a controller comprising one or more actuatable buttons, each actuatable button configured to communicate one or more control signals in response to actuation thereof by a second player;

at least one processor configured to:

receive data from the projectile tracking apparatus and process said data to calculate a trajectory of said projectile into a three-dimensional sports scene;

receive one or more control signals from the controller and determine one or more control commands for one or more animated objects based on the one or more control signals;

use said calculated trajectory and said one or more control commands to generate updated image data including a simulation of said launched projectile into said three-dimensional sports scene and the one or more animated objects as manipulated by said one or more control commands, the updated image data associated with a sports result; and cause display of the three-dimensional sport scene, the simulation of the launched projectile into the three-dimensional sport scene, and the manipulated one or more animated objects on the display surface; and a projectile spin sensing unit, wherein said at least one processor is configured to generate a profile of a projectile travel path over a plurality of images captured by the spin sensing unit, determine the projectile travel path length per image of said plurality of captured images, identify regions corresponding to one or more markings on said projectile, determine the distance between the regions in each image, calculate the spin rate and tilt of the projectile using the determined distance, the projectile travel path length and image capture frame rate and estimate a spin tilt axis of the projectile using the orientation of the regions in each image and the relative angle between the longitudinal axis of the regions and the longitudinal axis of the projectile travel path.

* * * * *